(12) United States Patent
Lee et al.

(10) Patent No.: US 7,936,340 B2
(45) Date of Patent: May 3, 2011

(54) DISPLAY DEVICE AND SENSING SIGNAL PROCESSING APPARATUS

(75) Inventors: Joo-Hyung Lee, Gwacheon-si (KR); Hyung-Guel Kim, Yongin-si (KR); Kee-Han Uh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 995 days.

(21) Appl. No.: 11/561,126

(22) Filed: Nov. 17, 2006

(65) Prior Publication Data

US 2007/0182719 A1    Aug. 9, 2007

(30) Foreign Application Priority Data

Jan. 27, 2006  (KR) .................. 10-2006-0008861

(51) Int. Cl.
*G06F 3/041* (2006.01)
(52) U.S. Cl. ............... 345/173; 345/176; 178/18.05; 178/18.06
(58) Field of Classification Search ............ 345/173, 345/178; 178/18.01–18.06
See application file for complete search history.

(56) References Cited

U.S. PATENT DOCUMENTS

| | | | |
|---|---|---|---|
| 4,017,848 A | | 4/1977 | Tannas, Jr. |
| 4,386,232 A | * | 5/1983 | Slater .......................... 345/173 |
| 4,550,310 A | | 10/1985 | Yamaguchi et al. |
| 5,459,463 A | | 10/1995 | Gruaz et al. |
| 5,495,077 A | | 2/1996 | Miller et al. |
| 6,501,529 B1 | | 12/2002 | Kurihara et al. |
| 6,738,048 B1 | * | 5/2004 | Rundel ......................... 345/173 |
| 7,602,380 B2 | * | 10/2009 | Yoshida et al. ............... 345/173 |
| 2002/0044208 A1 | * | 4/2002 | Yamazaki et al. ............. 348/272 |
| 2003/0085882 A1 | * | 5/2003 | Lu ................................... 345/173 |
| 2003/0098858 A1 | * | 5/2003 | Perski et al. .................. 345/173 |
| 2004/0032399 A1 | * | 2/2004 | Sekiguchi et al. ............. 345/173 |
| 2004/0090429 A1 | | 5/2004 | Geaghan et al. |
| 2004/0150629 A1 | | 8/2004 | Lee |
| 2004/0212599 A1 | | 10/2004 | Cok et al. |

(Continued)

FOREIGN PATENT DOCUMENTS

EP         0773497 A1     5/1997

(Continued)

OTHER PUBLICATIONS

European search report dated Feb. 5, 2010 of the corresponding European Patent Application No. 06123405.0.

*Primary Examiner* — Amare Mengistu
*Assistant Examiner* — Premal Patel
(74) *Attorney, Agent, or Firm* — Cantor Colburn LLP

(57) ABSTRACT

A display device includes a plurality of first and second sensing data lines; a plurality of first and second sensors connected to the first and second sensing data lines, respectively; a plurality of first signal converters which compare a first sensing data signal with a first reference voltage and output a first sensing output signal; a plurality of second signal converters which compare a second sensing data signal with the first reference voltage and output a second sensing output signal; a first position signal output unit which outputs a predetermined bit of a first position signal; a second position signal output unit which outputs a predetermined bit of a second position signal; a signal output unit which outputs a digital sensing signal in series; and a contact determiner which determines a contact position of the first and second sensors.

30 Claims, 13 Drawing Sheets

U.S. PATENT DOCUMENTS

| | | | |
|---|---|---|---|
| 2005/0052428 A1* | 3/2005 | Hayashi et al. | 345/173 |
| 2005/0219222 A1 | 10/2005 | Johnson et al. | |

FOREIGN PATENT DOCUMENTS

| | | |
|---|---|---|
| JP | 06034940 A | 2/1994 |
| JP | 2002-082771 | 3/2002 |
| JP | 2003-066417 | 3/2003 |
| JP | 2003-173238 | 6/2003 |
| JP | 2004-021327 | 1/2004 |
| JP | 2004-127129 | 4/2004 |
| JP | 2004-318257 | 11/2004 |
| JP | 2005-164709 | 6/2005 |
| KR | 1019980046013 | 9/1998 |
| KR | 1020030055979 | 7/2003 |
| KR | 1020040017139 | 2/2004 |
| KR | 1020040022243 | 3/2004 |
| KR | 1020040022354 | 3/2004 |
| KR | 1020040056013 | 6/2004 |
| KR | 1020040086734 | 10/2004 |
| KR | 1020040088739 | 10/2004 |
| KR | 1020050049925 | 5/2005 |

* cited by examiner

DISPLAY DEVICE AND SENSING SIGNAL PROCESSING APPARATUS

This application claims priority to Korean Patent Application No. 10-2006-0008861, filed on Jan. 27, 2006, and all the benefits accruing therefrom under 35 U.S.C. §119, the contents of which in its entirety are herein incorporated by reference.

BACKGROUND OF THE INVENTION (a) Field of the Invention

The present invention relates to a display device and a sensing signal processing apparatus.

(b) Description of the Related Art

As a representative display device, a liquid crystal display ("LCD") includes two panels which are respectively provided with pixel electrodes and a common electrode and a liquid crystal layer having dielectric anisotropy disposed therebetween. The pixel electrodes are arranged in a matrix shape, and each is connected to a switching element such as a thin film transistor ("TFT") to sequentially receive an image data voltage row by row. The common electrode is formed over the entire surface of a display panel to receive a common voltage. The pixel electrode, the common electrode, and the liquid crystal layer therebetween constitute a liquid crystal capacitor. The liquid crystal capacitor and a switching element which is connected thereto become a basic unit which constitutes a pixel.

In the liquid crystal display, an electric field is generated in a liquid crystal layer by applying a voltage to the two electrodes of a pixel. Transmittance of light passing through the liquid crystal layer is adjusted by adjusting the intensity of the electric field. A plurality of pixels working together may thereby obtain a desired image.

A touch screen panel is an apparatus which writes or draws a character or a picture through contact with a finger, a pen, etc., on a screen. Touch screen panels may also allow a machine such as a computer to perform a desired command by executing a program when an icon is pressed. A liquid crystal display to which a touch screen panel is attached has two primary functions: determining whether a contact occurs, and determining the contact's position information. However, the addition of a touch screen feature to a liquid crystal display comes with the addition of problems such as an increase in the cost of a display, yield decrease due to the addition of a manufacturing process for bonding a touch screen panel on a liquid crystal panel, luminance deterioration of the liquid crystal panel due to the passage of light through an additional layer, an increase in product thickness, and other related problems.

Therefore, technology for providing a sensing element consisting of a thin film transistor within a pixel itself which displays an image in a liquid crystal display instead of an additional touch screen panel has been developed.

However, in the existing sensing elements it is very difficult to accurately determine whether a sensing element is operated, and a signal processing apparatus for processing a signal from the sensing element has a complicated structure, thus increasing an amount of signal processing time and manufacture costs.

BRIEF SUMMARY OF THE INVENTION

The present invention has been made in an effort to provide a display device and a sensing signal processing apparatus having advantages of determining simply and accurately whether a sensing element is operated.

An exemplary embodiment of the present invention provides a display device including; a plurality of first sensing data lines extending in a first direction, a plurality of second sensing data lines extending in a second direction, a plurality of first sensors connected to the first sensing data lines, a plurality of second sensors connected to the second sensing data lines, a plurality of first signal converters which compare first sensing data signal from each of the first sensing data lines with a first reference voltage and output first sensing output signals, a plurality of second signal converters which compare second sensing data signals from each of the second sensing data lines with the first reference voltage and output second sensing output signals, a first position signal output unit which outputs a predetermined bit of first position signal depending on the plurality of first sensing output signals, a second position signal output unit which outputs a predetermined bit of a second position signal depending on the plurality of second sensing output signals; a signal output unit which outputs a digital sensing signal in series based on the first and second position signals from the first and second position signal output units, and a contact determiner which determines a contact position of the first and second sensors based on the digital sensing signal from the signal output unit.

Another exemplary embodiment of the present invention provides a sensing signal processing apparatus including; a plurality of first signal converters which compare a first sensing data signal from a plurality of first sensors with a first reference voltage and output first sensing output signals, a plurality of second signal converters which compare a second sensing data signal from a plurality of second sensors with the first reference voltage and output second sensing output signals, a first position signal output unit which outputs a predetermined bit of a first position signal depending on the plurality of first sensing output signals, a second position signal output unit which outputs a predetermined bit of a second position signal depending on the plurality of second sensing output signals, and a signal output unit which outputs a digital sensing signal in series based on the first and second position signals from the first and second position signal output units.

The first and second signal converters may include; a voltage divider which divide a voltage of a sensing data signal, wherein the sensing data signal is one of the first sensing data signals and the second sensing data signals, a comparator for comparing a divided voltage from the voltage divider with the first reference voltage, and a D flip-flop for outputting a flip-flop output signal from the comparator to a corresponding level of signal depending on a clock signal, wherein the voltage level of the flip-flop output signal depends on a clock signal.

The display device may further include a diode connected in a forward direction between a sensing data line and the voltage divider, wherein the sensing data line is one of the first sensing data lines and the second sensing data lines.

The voltage divider may include first and second resistors connected between the diode and a ground, and the comparator may be an operational amplifier in which a non-inversion terminal thereof is connected to a common terminal of the first and second resistors and an inversion terminal thereof is connected to the first reference voltage.

The display device may further include a diode connected in a backward direction between a sensing data signal and the voltage divider, wherein the sensing data line is one of the first sensing data lines and the second sensing data lines.

The voltage divider may include first and second resistors connected between the diode and a second reference voltage, and the comparator may be an operational amplifier in which a non-inversion terminal thereof is connected to a common terminal of the first and second resistors and a non-inversion terminal thereof is connected to the first reference voltage.

The first and second position signal output units may be encoders.

The first and second signal converters may output a high voltage level signal when the first and second sensors which are connected thereto, respectively, are operated by closing a switch.

The first and second position signal output units may convert a number for outputting a high voltage level signal, which is output by the first and second signal converters, to a binary and output the binary as the first and second position signals.

The present invention includes an exemplary embodiment of a display device wherein when there are multiple first signal converters and multiple second signal converters outputting a high voltage level signal the first and second position signal output units may convert a number output by the first and second signal converters which are positioned in the middle of the multiple first and second signal converters to a binary and output the binary as the first and second position signals.

The first and second position signal output units may convert the number output by the first and second signal converters positioned in the (q/2) or [(q/2)+1]th position to a binary and output the binary as the first and second position signals wherein there are an even number of first and second signal converters outputting a high voltage level signal and (q) is the highest number of the multiple first and second signal converters.

The first and second position signal output units may exclude the first and second sensing output signals from the first and second signal converters which exceed a predetermined number when the first and second signal converters for outputting a high voltage level signal exceed the predetermined number.

The contact determiner may read a digital sensing signal from the signal output unit when at least one of the first and second sensors is operated by closing a switch.

The signal output unit may include an interrupt signal generator for outputting an interrupt signal to the contact determiner.

The contact determiner may read a digital sensing signal from the signal output unit when the interrupt signal is at a high voltage level.

The interrupt signal generator may include a first OR circuit in which an input terminal thereof is connected to an output terminal of the first position signal output unit, a second OR circuit in which an input terminal thereof is connected to an output terminal of the second position signal output unit, and an AND circuit which is connected to output terminals of the first and second OR circuits.

The first and second sensors may be pressure sensors.

BRIEF DESCRIPTION OF THE DRAWINGS

Aspects, features and advantages of the present invention will be made apparent through descriptions of exemplary embodiments of the present invention with reference to the accompanying drawings, in which.

DETAILED DESCRIPTION OF THE INVENTION

Figure 1:
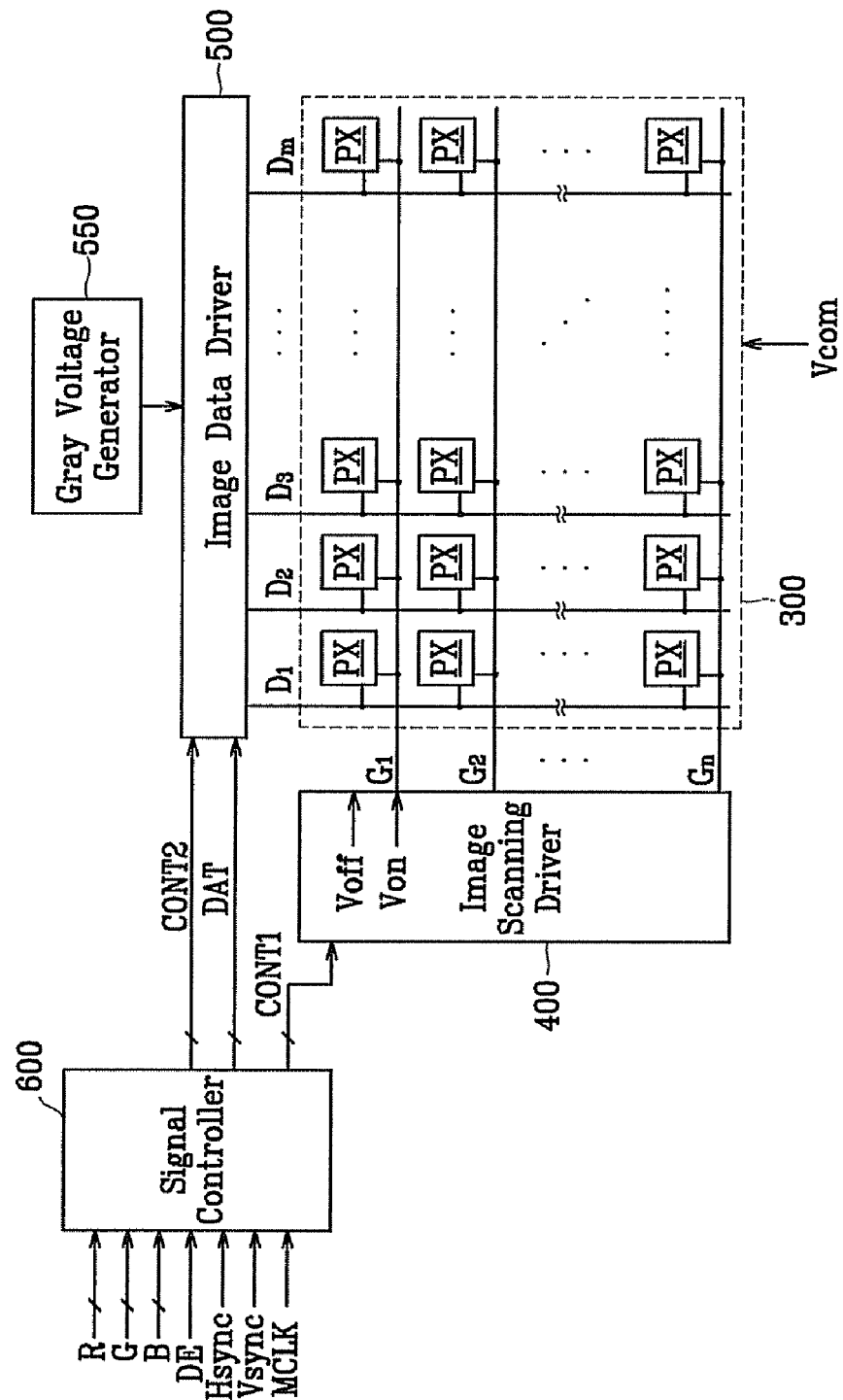
FIG. 1 is a block diagram of an exemplary embodiment of a liquid crystal display according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Now, a liquid crystal display, which is an exemplary embodiment of a display device according to the present invention, will be described in detail with reference to the drawings.

Figure 2:
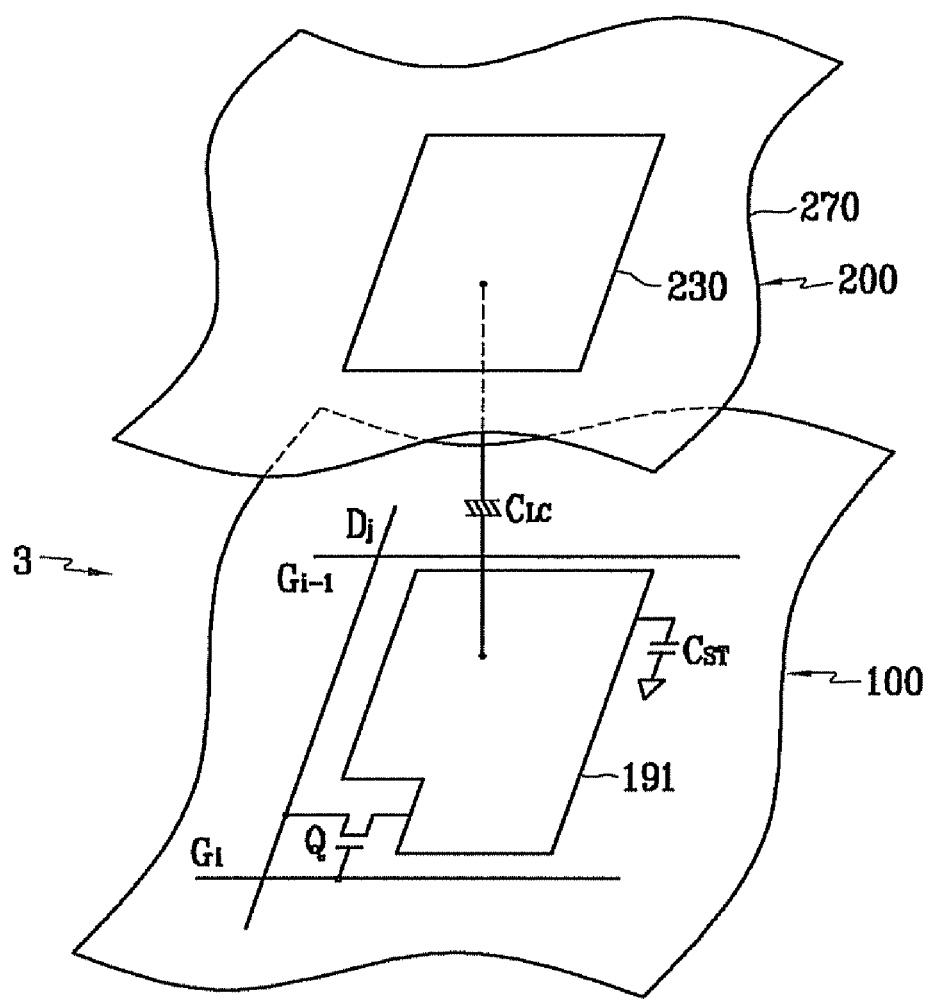
FIG. 2 is an equivalent circuit schematic diagram of an exemplary embodiment of one pixel of a liquid crystal display according to the present invention.
Figure 3:
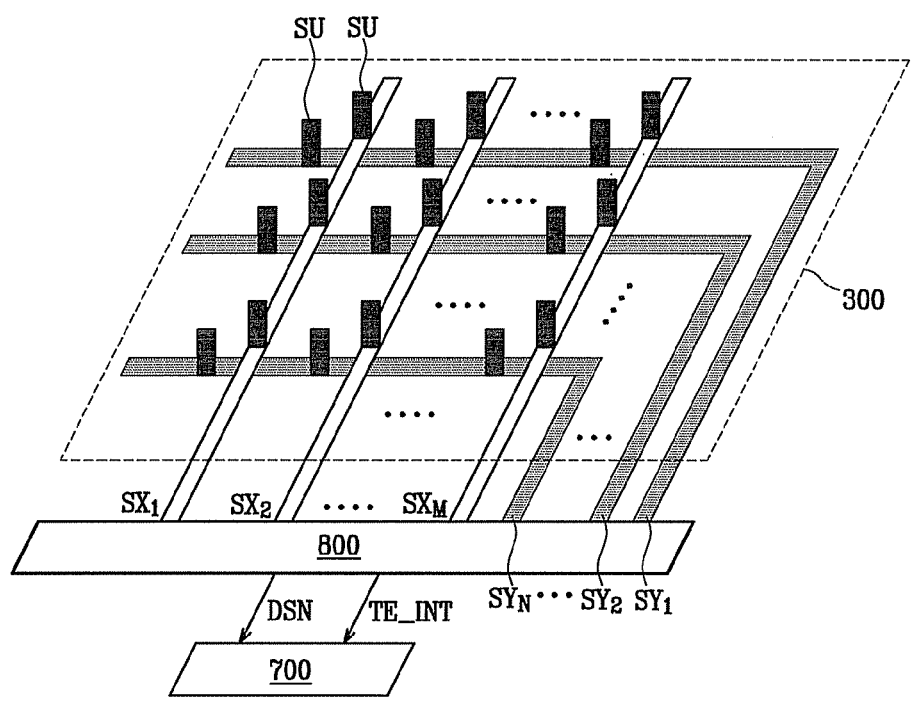
FIG. 3 is a block/diagram of an exemplary embodiment of a liquid crystal display according to the present invention.
Figure 4:
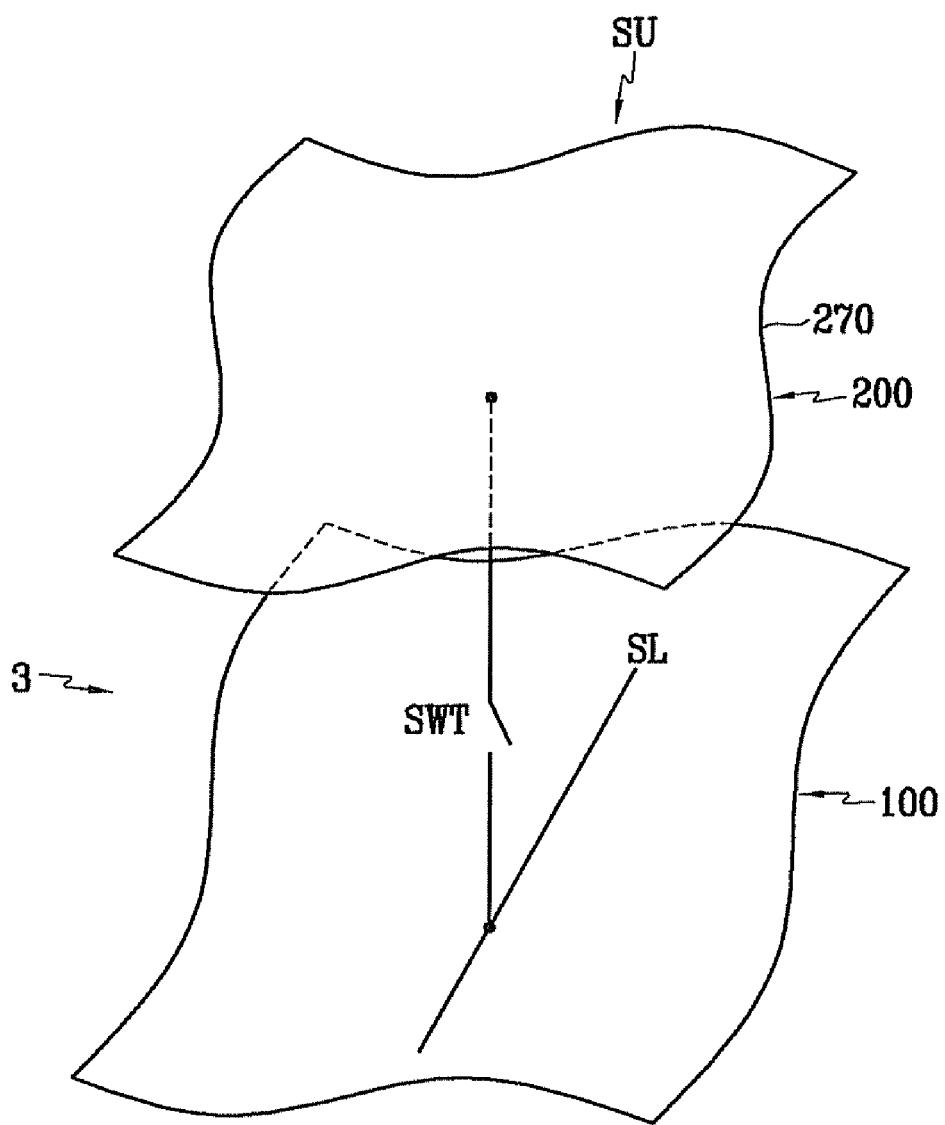
FIG. 4 is an equivalent circuit schematic diagram of an exemplary embodiment of one sensor of a liquid crystal display according to the present invention.
Figure 5:
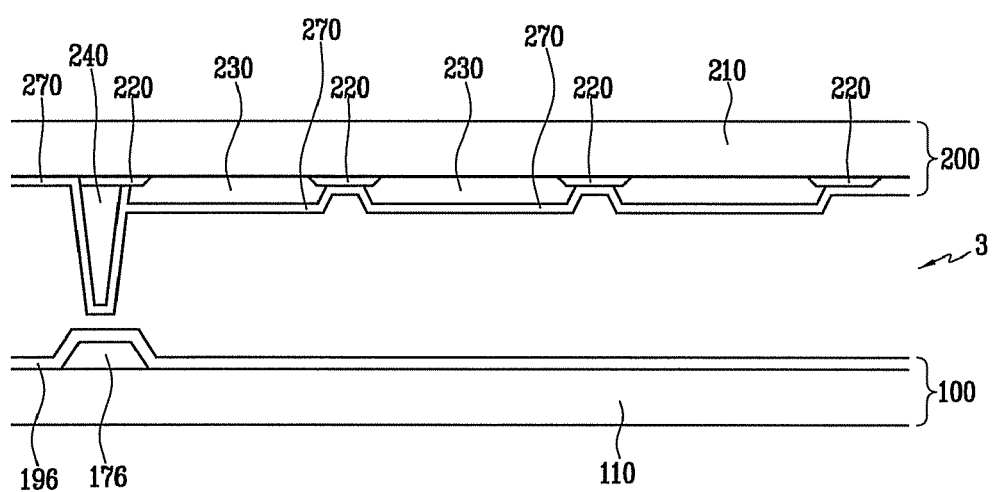
FIG. 5 is a schematic cross-sectional view of an exemplary embodiment of a pressure sensor according to the present invention.
Figure 6:
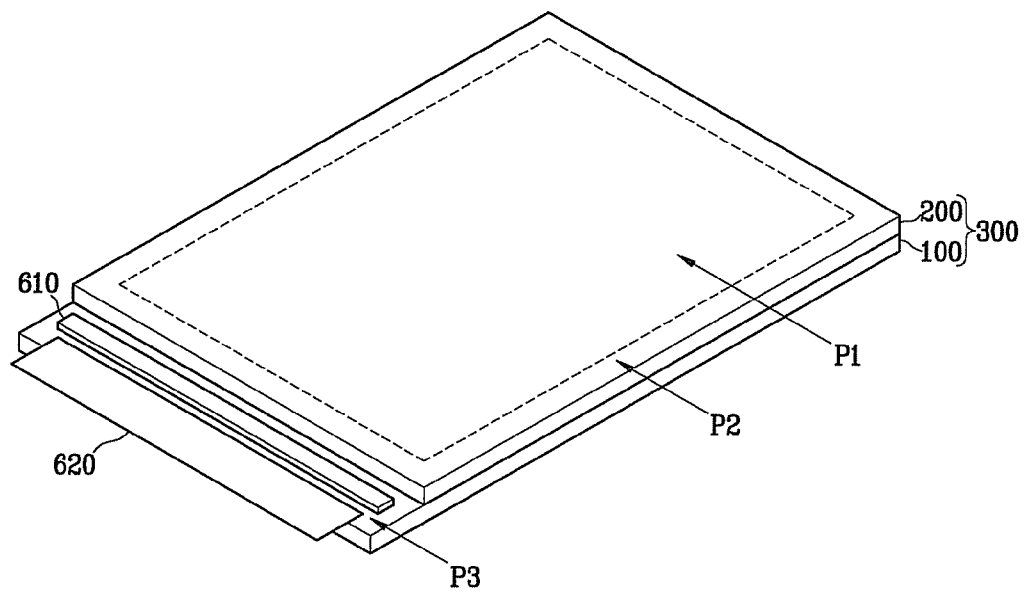
FIG. 6 is a schematic view of an exemplary embodiment of a liquid crystal display according to the present invention.

FIG. 1 is a block diagram of an exemplary embodiment of a liquid crystal display according to the present invention, and FIG. 2 is an equivalent circuit schematic diagram of an exemplary embodiment of one pixel of a liquid crystal display according to the present invention. FIG. 3 is a block diagram of an exemplary embodiment of a liquid crystal display according to the present invention, FIG. 4 is an equivalent circuit schematic diagram of an exemplary embodiment of one sensor of a liquid crystal display according to the present invention, and FIG. 5 is a schematic cross-sectional view of an exemplary embodiment of a pressure sensor according to the present invention. FIG. 6 is a schematic view of an exemplary embodiment of a liquid crystal display according the present invention.

Referring to FIGS. 1 to 3, the liquid crystal display according to an exemplary embodiment of the present invention includes a liquid crystal panel assembly 300 and an image scanning driver 400 which is connected thereto, an image data driver 500, a sensing signal processor 800, a gray voltage generator 550 which is connected to the image data driver 500, a contact determiner 700 which is connected to the sensing signal processor 800, and a signal controller 600 which controls them.

Referring to FIGS. 1 to 4, the liquid crystal panel assembly 300 includes a plurality of display signal lines $G_1$-$G_n$ and $D_1$-$D_m$, a plurality of pixels PX which are connected thereto and which are arranged in approximately a matrix shape, and a plurality of sensing signal lines $SY_1$-$SY_N$ and $SX_1$-$SX_M$ and a plurality of sensors SU which are connected thereto and which are arranged in approximately a matrix shape. Further, referring to FIGS. 2 and 5, the liquid crystal panel assembly 300 includes a thin film transistor array panel 100 and an opposing common electrode panel 200, a liquid crystal layer 3 interposed therebetween, and a spacer (not shown) which maintains a gap between the two panels 100 and 200 and which can be deformed to some extent by compression.

The display signal lines $G_1$-$G_n$ and $D_1$-$D_m$ include a plurality of image scanning lines $G_1$-$G_n$ which transfer an image scanning signal and image data lines $D_1$-$D_m$ which transfer an image data signal. The sensing signal lines $SY_1$-$SY_N$ and $SX_1$-$SX_M$ include a plurality of vertical sensing data lines $SX_1$-$SX_M$ and a plurality of horizontal sensing data lines $SY_1$-$SY_N$ which transfer a sensing data signal.

The image scanning lines $G_1$-$G_n$ and the horizontal sensing data lines $SY_1$-$SY_N$ extend in approximately a row direction and are substantially parallel to each other, and the image data lines $D_1$-$D_m$ and the vertical sensing data lines $SX_1$-$SX_M$ extend in approximately a column direction and are substantially parallel to each other.

Each pixel PX includes a switching element Q connected to one of the plurality of image scanning lines $G_1$-$G_n$ and one of the plurality of image data lines $D_1$-$D_m$, and a storage capacitor Cst and a liquid crystal capacitor Clc. Alternative exemplary embodiments include configurations wherein the storage capacitor Cst may be omitted.

The switching element Q is a three terminal element, one exemplary embodiment of which is a thin film transistor, provided in the thin film transistor array panel 100, and a control terminal thereof is connected to the image scanning lines $G_1$-$G_n$, an input terminal thereof is connected to the image data lines $D_1$-$D_m$, and an output terminal thereof is connected to the liquid crystal capacitor Clc and the storage capacitor Cst. Exemplary embodiments of the thin film transistor include amorphous silicon or polycrystalline silicon.

The liquid crystal capacitor Clc includes a pixel electrode 191 of the thin film transistor array panel 100 and a common electrode 270 of the common electrode panel 200 as two terminals, and the liquid crystal layer 3 between the two electrodes 191 and 270 functions as a dielectric material. The pixel electrode 191 is connected to the switching element Q, and the common electrode 270 is formed on an entire surface of the common electrode panel 200 and receives a common voltage Vcom. Alternative exemplary embodiments include configurations where the common electrode 270 may be provided in the thin film transistor array panel 100. In such an alternative exemplary embodiment at least one of the two electrodes 191 and 270 may be formed in a line shape or a bar shape.

The storage capacitor Cst, which may supplement the liquid crystal capacitor Clc, is formed at the overlap of a separate signal line (not shown) and the pixel electrode 191 which is provided in the thin film transistor array panel 100. An insulator is interposed between the separate signal line and the pixel electrode 191, and a predetermined voltage such as a common voltage Vcom is applied to the separate signal line. Alternative exemplary embodiments include configurations wherein the storage capacitor Cst may be formed via an insulator disposed directly on the pixel electrode 191 at the overlap of the pixel electrode 191 and an image scanning line.

In order to present a color display colors may be displayed by allowing each pixel PX to inherently display one of the primary colors, with each primary color located proximately to one another (a color display method referred to as spatial division) or an alternative method of displaying color is to sequentially display each of the primary colors (a color display method referred to as temporal division). A desired color is achieved with the spatial and temporal sum of the primary colors. An exemplary embodiment of a set of the primary colors includes red, green, and blue. FIG. 2 shows as an example of spatial division in which each pixel PX is provided with a color filter 230 for displaying one of the primary colors in a region of the common electrode panel 200 corresponding to the pixel electrode 191. An alternative exemplary embodiment includes the configuration wherein the color filter 230 may be formed on or under the pixel electrode 191 of the thin film transistor array panel 100.

At least one polarizer (not shown) for polarizing light is attached to the outside surface of the liquid crystal panel assembly 300, either above the common electrode panel 200 or below the TFT array panel 100.

The sensor SU may have a structure shown in FIGS. 4 and 5. The sensor SU which is shown in FIGS. 4 and 5 is a pressure sensor including a switch SWT which is connected to horizontal and vertical sensing data lines (hereinafter, referred to as a "sensing data lines") which are designated by reference letters SL.

The switch SWT has the common electrode 270 of the common electrode panel 200 as one terminal and a sensing data line SL of the thin film transistor array panel 100 as a second terminal, and at least one of the two terminals is protruded from one panel toward the other, whereby the two terminals may be physically and electrically connected to each other by a user. Accordingly, a common voltage Vcom from the common electrode 270 is output to a sensing data line SL as a sensing data signal.

A cross-sectional structure of an exemplary embodiment of a pressure sensor SU will be described in detail with reference to FIG. 5.

As shown in FIG. 5, in the TFT array panel 100, a plurality of lower protrusions 176 are formed on an insulation substrate 110. Exemplary embodiments of the insulation substrate 110 may be made of transparent glass, plastic, or other similar substances. Furthermore, image scanning lines $G_1$-$G_m$, image data lines $D_1$-$D_m$, and a switching element Q, and other pixel elements, are formed on the insulation substrate 110, and the lower protrusions 176 may be formed at approximately the same time as the image scanning lines $G_1$-$G_m$ or the image data lines $D_1$-$D_m$.

Sensing data lines 196 are exposed on the protrusions 176, and they may be made of a transparent conductor such as indium tin oxide ("ITO") or indium zinc oxide ("IZO").

In the upper panel 200 which is opposite to the lower panel 100, a light blocking member 220 is formed on an insulation substrate 210, exemplary embodiments of which may be made of transparent glass, plastic, or other similar substances. The light blocking member 220 is also called a black matrix, and prevents light leakage between pixels.

A plurality of upper protrusions 240 may be made of an organic material, or other similar substance, are formed on the light blocking member 220. Each upper protrusion 240 is disposed to correspond to a position where a lower protrusion 176 is formed. The upper protrusion 240 may be formed into a desired shape and height by coating and patterning an organic layer, or by any other suitable well-known process.

Next, a plurality of color filters 230 are formed on the insulation substrate 210 and the light blocking member 220, and are disposed to correspond to an opening region which is surrounded with the light blocking member 220. In one exemplary embodiment the color filter 230 extends in a vertical direction along a pixel to form a stripe. Each color filter 230 may display one of three primary colors such as red, green, and blue.

The common electrode 270 is formed on the color filter 230, the light blocking member 220, the exposed substrate 210, and the upper protrusion 240. Exemplary embodiments of the common electrode 270 are made of a transparent conductor such as ITO or IZO and may be formed in a desired shape by patterning the electrode after coating a conductor on the electrode. A common voltage (Vcom) is applied to the common electrode 270.

At this time, an overcoat (not shown), exemplary embodiments of which are made of an organic insulator, is formed under the common electrode 270 to protect the color filter 230 and to prevent the color filter 230 from being exposed to the liquid crystal layer 3.

A plurality of column spacers (not shown), exemplary embodiments of which are made of an organic material, may be formed on the common electrode 270. In one exemplary embodiment the column spacers may be uniformly distributed in the liquid crystal panel assembly 300 and form a gap between the lower panel 100 and the upper panel 200 by supporting the two panels.

In one exemplary embodiment, similar to an exemplary embodiment of the upper protrusion 240, the column spacers may be formed into a desired shape and height by coating and patterning an organic layer.

The lower protrusion 176 is arranged so that the sensing data line 196 disposed on the lower protrusion 176 may be easily brought into contact with the common electrode 270 disposed on the upper protrusion 240. Pressure, which may be applied by a finger, a stylus, etc., narrows the gap between the upper and lower protrusions 240 and 176. The common electrode 270 may thereby be brought into contact with the sensing data line 196.

An alignment layer (not shown) for aligning a liquid crystal layer is coated on an inner surface of the display panels 100 and 200, and at least one polarizer (not shown) is provided on an outer surface of the display panels 100 and 200 as described above.

The liquid crystal display may further include a sealant (not shown) which couples the TFT array panel 100 and the common electrode panel 200 together. The sealant may be positioned at the edge of the upper panel 200.

As described above, since a liquid crystal layer 3 is interposed between the TFT array panel 100 and the common electrode panel 200 and the two display panels 100 and 200 are supported by a plurality of column spacers, the sensing data line 196 and the common electrode 270 which is disposed on the upper protrusion 240 maintains a fixed gap. In one exemplary embodiment the gap may be about 0.1 µm to 1.0 µm.

In an alternative exemplary embodiment the two display panels 100 and 200 may be supported by beads spacers (not shown) instead of the column spacers 320.

The sensing data line 196 and the common electrode 270 which surrounds the upper protrusions 240 constitute a switch SWT as shown in the equivalent circuit schematic diagram of FIG. 4.

The sensor SU shown in FIG. 3 schematically represents only a plurality of lower protrusions 176 formed in the TFT array panel 100. In the upper panel 200, a plurality of upper protrusions 240 are formed at positions corresponding to the lower protrusions 176.

The Y coordinate of a contact point can be determined by analyzing a sensing data signal flowing through the horizontal sensing data lines $SY_1$-$SY_N$, and an X coordinate of a contact point can be determined by analyzing a sensing data signal flowing through the vertical sensing data lines $SX_1$-$SX_M$.

In the current exemplary embodiment the pressure sensor SU is disposed between two adjacent pixels PX. The density of a pair of sensors SU, each of which is connected to the horizontal and vertical sensing data lines $SY_1$-$SY_N$ and $SX_1$-$SX_M$ and which are adjacently disposed in an intersecting region thereof, may be, for example, about ¼ of the dot density wherein one dot includes, for example, three pixels PX which are arranged parallel to each other and which display three primary colors of red, green, and blue. In this exemplary embodiment the unit pixels of one dot may work in conjunction to display multiple colors. A dot may then also be defined as the smallest resolution unit of the liquid crystal display. However, in an alternative exemplary embodiment, one dot may be composed of at least four unit pixels PX, in such an exemplary embodiment each pixel PX may display one of three primary colors and one white color.

Examples in which the density of a pair of sensors SU is ¼ of the dot density include an exemplary embodiment where the horizontal and vertical resolution of a pair of sensors SU is ½ of the horizontal and vertical resolution of the liquid crystal display, respectively. In such an exemplary embodiment, there may be a pixel row and a pixel column where there is no sensor SU.

One advantage if the density of the sensor SU and the dot density are set to this degree, is that the liquid crystal display may be applied to an application requiring high accuracy, such as character recognition. The resolution of the sensor SU may be higher or lower, as necessary.

Referring again to FIGS. 1 and 3, the gray voltage generator 550 generates two gray voltage sets (or alternatively a reference gray voltage set) which controls the transmittance of the pixels PX. One of the two sets has a positive value for a common voltage Vcom, and the other set has a negative value.

The image scanning driver 400 is connected to the image scanning lines $G_1$-$G_n$ of the liquid crystal panel assembly 300 to apply an image scanning signal consisting of a combination of a gate-on voltage Von for turning on the switching element Q and a gate-off voltage Voff for turning off the switching element Q to the image scanning lines $G_1$-$G_n$.

The image data driver 500 is connected to the image data lines $D_1$-$D_m$ of the liquid crystal panel assembly 300, and selects a gray voltage from the gray voltage generator 550 and applies the voltage as an image scanning signal to the image data lines $D_1$-$D_m$. However, when the gray voltage generator 550 does not supply a voltage for all grays but supplies only a predetermined number of reference gray voltages, the image data driver 500 divides the reference gray voltages, generates gray voltages for all the varying levels of grays, and selects an image data signal from among them.

The sensing signal processor 800 shown in FIG. 3 is connected to the sensing data lines $SY_1$-$SY_N$ and $SX_1$-$SX_M$ of the liquid crystal panel assembly 300 to receive a sensing data signal which is output through the sensing data lines $SY_1$-$SY_N$ and $SX_1$-$SX_M$, and performs signal processing and generation of a digital sensing signal DSN.

The contact determiner 700 may comprise a central processor unit ("CPU"), and it receives a digital sensing signal DSN from the sensing signal processor 800 to determine a contact position of a pressure sensor SU where the switch SWT has been completed.

In this exemplary embodiment the signal controller 600 controls an operation of the image scanning driver 400, the image data driver 500, the gray voltage generator 550, and the sensing signal processor 800.

In one exemplary embodiment each of the driving devices 400, 500, 550, 600, 700, and 800 may be directly mounted on the liquid crystal panel assembly 300 in a form of at least one IC chip, mounted on a flexible printed circuit film (not shown) to be attached to the liquid crystal panel assembly 300 in a form of a tape carrier package ("TCP"), or mounted on a separate printed circuit board ("PCB") (not shown). In an alternative exemplary embodiment, the driving devices 400, 500, 550, 600, 700, and 800, the signal lines $G_1$-$G_n$, $D_1$-$D_m$, $SY_1$-$SY_N$, and $SX_1$-$SX_M$, and the thin film transistor Q, may be integrated in the liquid crystal panel assembly 300.

Referring to FIG. 6, the liquid crystal panel assembly 300 is divided into a display region P1, an edge region P2, and an exposure region P3. Most of the pixels PX, the sensors SU, and the signal lines $G_1$-$G_n$, $D_1$-$D_m$, $SY_1$-$SY_N$, and $SX_1$-$SX_M$ are positioned in the display region P1. The common electrode panel 200 includes a light blocking member 220, and the light blocking member 220 covers most of the edge region P2 to block light from the outside. In the current exemplary embodiment the common electrode panel 200 is smaller than the thin film transistor array panel 100 and thus exposes a part of the thin film transistor array panel 100 to form an exposure region P3. A single chip 610 is mounted in the exposure region P3, and a flexible printed circuit board ("FPC" board) 620 is attached to the exposure region P3.

In the current exemplary embodiment the single chip 610 includes the driving devices, e.g., the image scanning driver 400, the image data driver 500, the gray voltage generator 550, the signal controller 600, the contact determiner 700 and the sensing signal processor 800 for driving the liquid crystal display. By integrating the driving devices 400, 500, 550, 600, 700 and 800 in the single chip 610, the mounting area thereof can be reduced and power consumption can be lowered. In an alternative exemplary embodiment at least one of the driving devices or at least one circuit element constituting a driving device may be disposed outside of the single chip 610.

The image signal lines $G_1$-$G_n$ and $D_1$-$D_m$ and the sensing data lines $SY_1$-$SY_N$ and $SX_1$-$SX_M$ are extended to the exposure area P3 to connect to the corresponding driving devices 400, 500, and 800.

The FPC board 620 receives a signal from an external device (not shown) to transfer to the single chip 610 or the liquid crystal panel assembly 300, and an end tip thereof is composed of a connector (not shown) in order to easily connect to external devices.

Now, a display operation and a sensing operation of the liquid crystal display will be described in detail.

As shown in FIG. 1, the signal controller 600 receives input image signals R, G, and B and an input control signal for controlling the display of the signals from an external apparatus (not shown). The input image signals R, G, and B include luminance information for each pixel PX, and the luminance has a predetermined number of grays, for example, 1024 ($=2^{10}$), 256 ($=2^8$), or 64 ($=2^6$). The input control signal includes, for example, a vertical synchronization signal Vsync, a horizontal synchronizing signal Hsync, a main clock signal MCLK, and a data enable signal DE.

The signal controller 600 appropriately processes the input image signals R, G, and B corresponding to an operating condition of the liquid crystal panel assembly 300 and the image data driver 500 based on the input image signals R, G, and B and the input control signals, generates an image scan control signal CONT1, an image data control signal CONT2, and a sensing data control signal CONT3, then sends the image scan control signal CONT1 to the image scanning driver 400, sends the image data control signal CONT2 and the processed image signal DAT to the image data driver 500, and sends the sensing data control signal CONT3 to the sensing signal processor 800.

The image scan control signal CONT1 includes a scanning start signal STV for instructing the scanning start, and at least one clock signal for controlling the output of a gate-on voltage Von. In one exemplary embodiment the image scan control signal CONT1 may further include an output enable signal OE for limiting a sustain time of the gate-on voltage Von.

The image data control signal CONT2 includes a horizontal synchronization start signal STH for informing of the start of one pixel row of image data DAT, and a data clock signal HCLK and a load signal LOAD for applying an image data signal to the image data lines $D_1$-$D_m$. Exemplary embodiments of the image data control signal CONT2 may further include an inversion signal RVS for inverting the voltage polarity of an image data signal to a common voltage Vcom (hereinafter, "voltage polarity of an image data signal to a common voltage" is referred to as "polarity of an image data signal").

The image data driver 500 receives a digital image signal DAT for one row of pixels PX depending on the image data control signal CONT2 from the signal controller 600, converts the digital image signal DAT to an analog image data signal by selecting a gray voltage corresponding to each digital image signal DAT, and then applies the converted signal to the corresponding image data lines $D_1$-$D_m$.

The image scanning driver 400 applies a gate-on voltage Von to the image scanning lines $G_1$-$G_n$ depending on the image scan control signal CONT1 from the signal controller 600 to turn on a switching element Q which is connected to the image scanning lines $G_1$-$G_n$. Then, an image data signal which is applied to the image data lines $D_1$-$D_m$ is applied to a corresponding pixel PX through the turned-on switching element Q.

The difference between a voltage of an image data signal which is applied to the pixel PX and a common voltage Vcom is represented as a charged voltage, e.g., a pixel voltage of the liquid crystal capacitor Clc. Liquid crystal molecules change their arrangement depending on a magnitude of the pixel voltage, so that polarization of light passing through the liquid crystal layer 3 varies according to the voltage difference between the pixel electrode and the common electrode. This difference is stored in the liquid crystal capacitor Clc. The variance in the polarization induces a variance in the amount of light transmitted by a polarizer which is attached to the display panel assembly 300, thereby an individual pixel may display many varying amounts of light, known as gray levels. A plurality of pixels working together may display a desired image having many different pixels of varying light transmittance.

By repeating the process with a frequency of one horizontal period (referred to as "1H", the same as one period of a horizontal synchronizing signal Hsync and a data enable signal DE), a gate-on voltage Von is sequentially applied to all image scanning lines $G_1$-$G_n$, whereby an image data signal is applied to all pixels PX so that an image of one frame is displayed.

An inversion signal RVS, which is applied to the image data driver 500, is controlled so that the next frame starts when one frame ends, and the polarity of an image data signal which is applied to each pixel PX is opposite to the polarity in a previous frame (this is also sometimes called frame inversion). According to characteristics of the inversion signal RVS, even within one frame, the polarity of an image data signal flowing through one image data line may be changed (e.g.: row inversion and dot inversion), or the polarity of the image data signals which are applied to one pixel row may be different from each other (e.g.: column inversion, dot inversion).

The sensing signal processor 800 generates a digital sensing signal DSN corresponding to X-axis and Y-axis contact positions of the pressure sensor SU which is connected to the sensing data lines $SY_1$-$SY_N$ and $SX_1$-$SX_M$ by converting a sensing data signal flowing through the sensing data lines $SY_1$-$SY_N$ and $SX_1$-$SX_M$. The sensing signal processor 800 then transfers the signal to the contact determiner 700. The sensing signal processor 800 will be described in detail below.

The contact determiner 700 receives the digital sensing signal DSN and by using that signal determines a contact position of the pressure sensor SU. The contact determiner 700 may then control an operation corresponding to a command, a menu, or another task which is selected by a user.

Now, referring to FIGS. 7A through 8B, a sensing signal processor 800 according to an exemplary embodiment of the present invention will be described in detail.

Figure 7A:
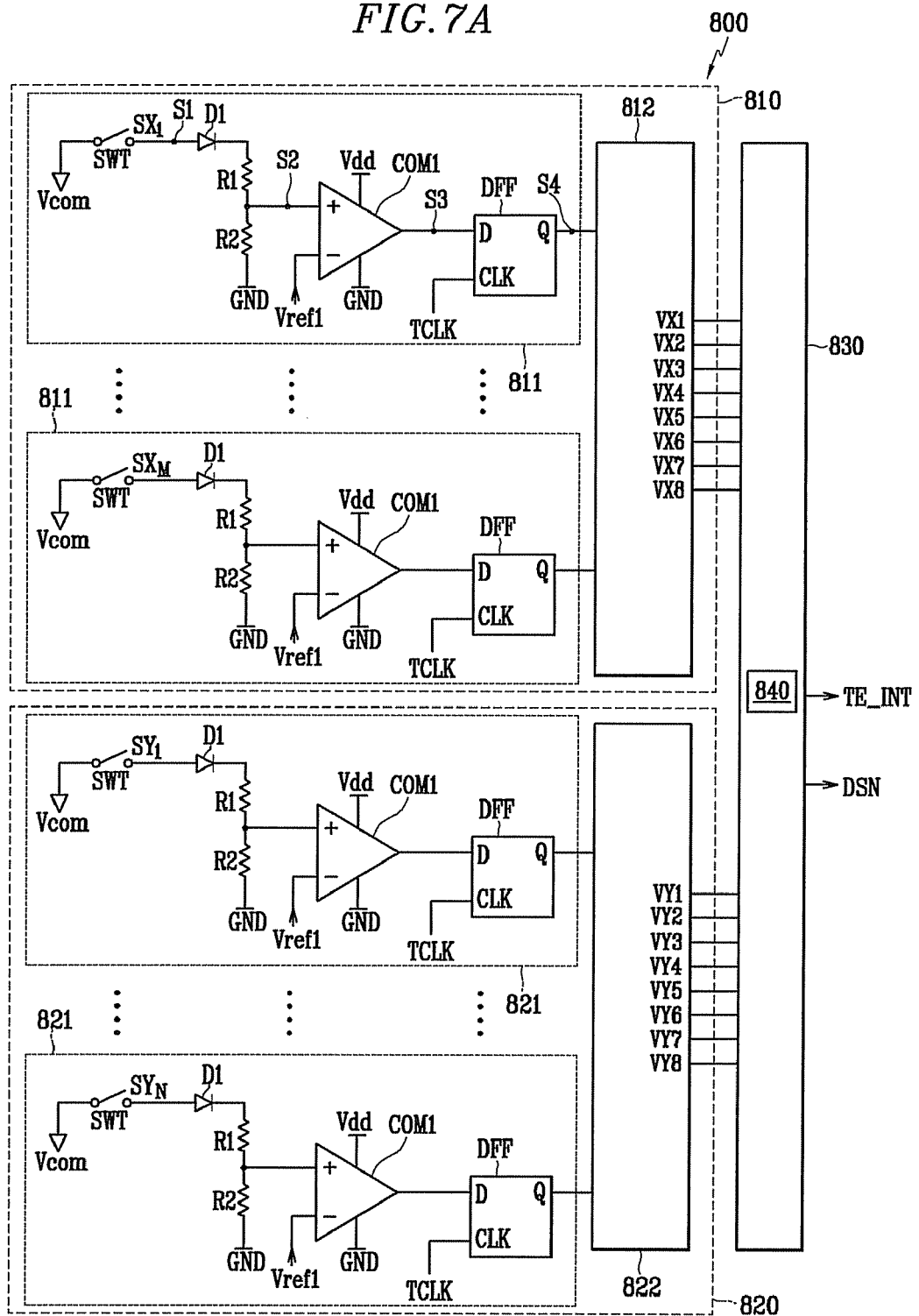
FIGS. 7A and 7B are circuit diagrams of an exemplary embodiment of a signal processing apparatus of a pressure sensor according to the present invention.
Figure 7B:
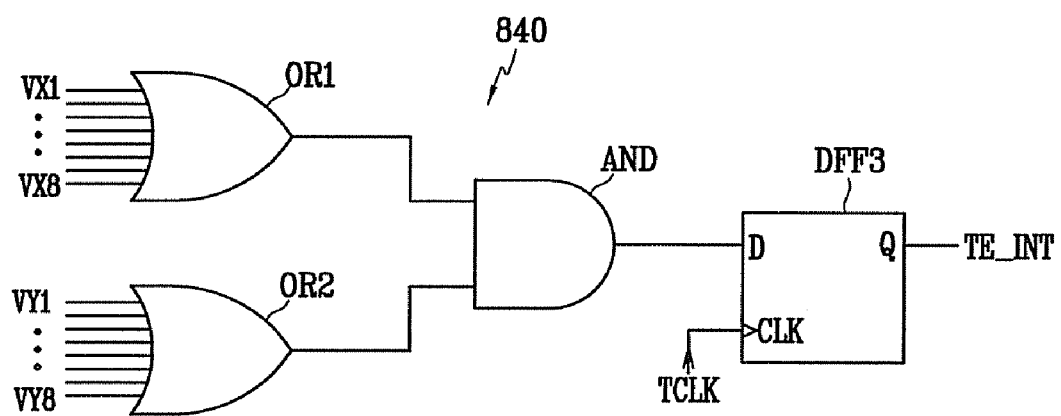
Figure 8A:
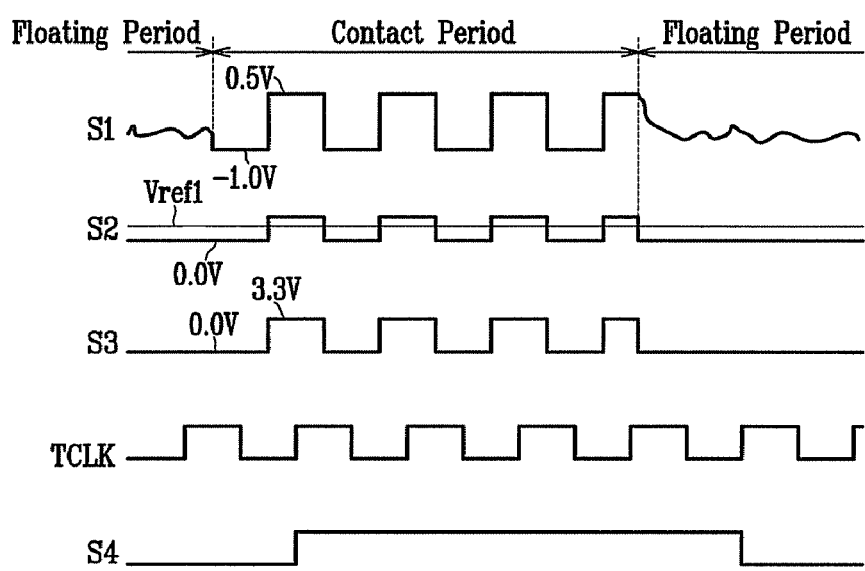
FIG. 8A is an operational timing chart of an exemplary embodiment of a signal processing apparatus of a pressure sensor according to the present invention, and illustrates an operation of the pressure sensor which is connected to one sensing data line.
Figure 8B:
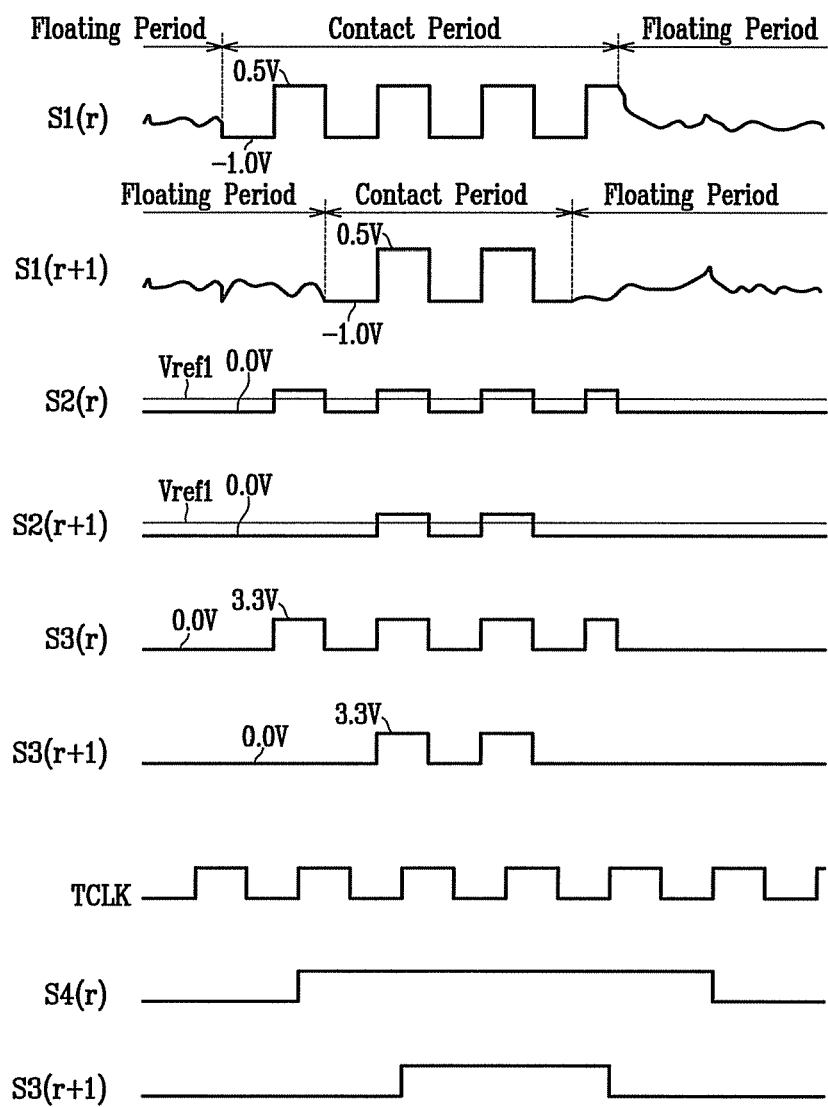
FIG. 8B is an operational timing chart of an exemplary embodiment of a signal processing apparatus of a pressure sensor according to the present invention, and illustrates an operation of a pressure sensor which is connected to two different sensing data lines.

FIGS. 7A and 7B are circuit diagrams of an exemplary embodiment of a signal processing apparatus of a pressure sensor according to the present invention. FIG. 8A is an operational timing chart of an exemplary embodiment of a signal processing apparatus of a pressure sensor according to the present invention, and illustrates an operation of a pressure sensor which is connected to one sensing data line. FIG. 8B is an operational timing chart of an exemplary embodiment of a signal processing apparatus of a pressure sensor according to the present invention, and illustrates an operation of a pressure sensor which is connected to two different sensing data lines.

As shown in FIGS. 7A and 7B, the exemplary embodiment of a sensing signal processor 800 according to the present invention includes a vertical sensing data signal read unit 810, a horizontal sensing data signal read unit 820, and a signal output unit 830 connected to the vertical and horizontal sensing data signal read units 810 and 820. The signal output unit 830 outputs a predetermined bit number of digital sensing signals DSN.

The vertical sensing data signal read unit 810 includes M number of signal converters 811, each of which is connected to the M number of vertical sensing data lines $SX_1$-$SX_M$, and an encoder 812 with an input terminal connected to the M number of signal converters 811.

The horizontal sensing data signal read unit 820 includes N number of signal converters 821, each of which is connected to the N number of horizontal sensing data lines $SY_1$-$SY_N$, and an encoder 822 with an input terminal connected to the N number of signal converters 821.

The signal converters 811 and 821 are formed with substantially the same structure and perform substantially the same operation. A structure of the signal converters 811 connected to the vertical sensing data line SX1 will now be described.

The signal converters 811 each include a diode D1 connected to the vertical sensing data line SX1 in a forward direction, resistors R1 and R2 for dividing a voltage are connected in series between the diode D1 and the ground, a comparator COM1 having a non-inversion terminal (+) connected to a common terminal of the resistors R1 and R2 having an inversion terminal (−) connected to a reference voltage Vref1 having a split supply voltage with a positive split Vdd and an opposite split to ground GND, and a D flip-flop DFF having an input terminal D connected to an output terminal of the comparator COM1, having a clock terminal connected to a clock signal TCLK, and having an output terminal connected to the encoder 812. In one exemplary embodiment the comparator may comprise an operational amplifier.

An exemplary embodiment of the signal output unit 830 may be a serial peripheral interface ("SPI") circuit or an inter-integrated circuit ("I²C"), and includes an interrupt signal generator 840 as shown in FIG. 7B.

The interrupt signal generator 840 includes an OR gate circuit OR1 with each input terminal connected to output terminals VX1-VX8 of the encoder 812, an OR gate circuit OR2 with each input terminal connected to the output terminals VX1-VX8 of the encoder 822, an AND gate circuit AND with an input terminal connected to the output terminals of the OR gate circuits OR1 and OR2, and a D flip-flop DFF3 having an input terminal D connected to the output terminal of the AND gate circuit AND and having a clock terminal CLK connected to a clock signal TCLK.

An operation of the sensing signal processor 800 is as follows.

In one exemplary embodiment if a common voltage Vcom has a high level (e.g., +5V) and a low level (e.g., −1.0V), it swings between the high level and the low level about every 1H and thus the liquid crystal display is a row inversion type.

Operations of the signal converters 811 and 821 which are connected to each of the sensing data lines $SX_1$-$SX_M$ and $SY_1$-$SY_N$ are substantially the same, and thus only an operation of the signal converter 811 which is connected to the first vertical sensing data line SX1 will be described.

If the switch of the pressure sensor SU which is connected to the vertical sensing data line SX1 is closed due to an external pressure, a sensing data signal P1 is output from the switch SWT to the resistors R1 and R2, as shown in FIG. 8A. The sensing data signal is almost the same as that in the common voltage Vcom.

The resistors R1 and R2 lower a voltage level of the signal by dividing a voltage of the input sensing data signal into predetermined voltage magnitudes and then apply the signal to the non-inversion terminal (+) of the comparator COM1. A magnitude of the reference voltage Vref1 which is applied to the inversion terminal (−) of the comparator COM1 is set to be lower than a high level Vdd of the split supply voltage. Accordingly, as shown in FIG. 8A, the comparator COM1 outputs a high level of voltage (about 3.3V) in a period in which a magnitude of the voltage which is applied to the non-inversion terminal (+) is larger than that of the reference voltage Vref1, and outputs a low level of voltage (about 0V) when the voltage applied to the non-inversion terminal (+) is smaller than that of the reference voltage Vref1. The comparator COM1 thereby applies the voltages to the input terminal D of the D flip-flop DFF. That is, the comparator COM1 outputs a high level of voltage only in a period in which the output signal P1 of the switch SWT maintains a high level within a contact period.

The D flip-flop DFF outputs a corresponding level of signal through the output terminal Q based on a level of a signal which is applied to the input terminal D when a clock signal TCLK, which is applied to the clock terminal CLK, is in a rising edge. That is, if a high level of signal is applied to the input terminal D when the clock signal TCLK is at a high voltage or in an "on" state, a high level of signal is output until the clock signal TCLK reaches the next "on" state, and if a low level of signal is applied to the input terminal D when the clock signal TCLK is in an "on" state, a low level of signal is output until the clock signal reaches the next "on" state, whereby the same signal as shown in FIG. 8A is output to the encoder 812.

In this way, an output state of the signal converters 811 and 821 which are connected to each of the sensing data lines $SX_1$-$SX_M$ and $SY_1$-$SY_N$ is determined depending on whether the signal converters 811 and 821 have an open or closed switch SWT by operations of the signal converters 811 and 821.

The encoders 812 and 822 convert a predetermined bit, for example 8-bits of a digital signal, to an X-axis position signal and a Y-axis position signal, and apply the signals to the signal output unit 830 based on the M number of signals and the N number of signals which are applied to each input terminal within a predetermined time period.

For example, if a high level of signal is applied from the signal converter 811 which is connected to a first vertical sensing data line SX1 (as when at least one of a plurality of pressure sensors SU is connected to the first vertical sensing data line $SX_1$), the encoder 812 outputs "00000001" as an X-axis position signal in parallel through the output terminals VX1-VX8. If a high level of signal is applied from the signal converter 811 which is connected to a second vertical sensing data line $SX_2$ (as when at least one of the plurality of pressure sensors SU is connected to the second vertical sensing data line $SX_2$), the encoder 812 outputs "00000010" as an X-axis position signal through the output terminals VX1-VX8, and so on for the rest of the signal converters 811.

Similarly, in an encoder 822 of a horizontal sensing data signal read unit 820, if a high level of signal is applied from the signal converter 821 which is connected to the first horizontal vertical sensing data line $SY_1$, the encoder 822 outputs "00000001" as a Y-axis position signal in parallel through the output terminals VX1-VX8. If a high level of signal is applied from the signal converter 821 which is connected to the second horizontal sensing data line $SY_2$, the encoder 822 outputs "00000010" as a Y-axis position signal through the output terminals VY1-VY8.

In this way, if a high level of signal is output from the signal converters 811 and 821 which are connected to corresponding sensing data lines $SX_1$-$SX_M$ and $SY_1$-$SY_N$ by an operation of the pressure sensor SU which is connected to each sensing data lines $SX_1$-$SX_M$ and $SY_1$-$SY_N$, the encoders 812 and 822 output an 8-bit signal corresponding to the number of the corresponding signal converters 811 and 821 to which a high level of signal is applied as an X-axis position signal and a Y-axis position signal through the corresponding output terminals VX1-VX8 and VY1-VY8.

However, if the pressure sensors SU which are connected to a plurality of vertical sensing data lines $SX_1$-$SX_M$ or a plurality of horizontal sensing data lines $SY_1$-$SY_N$ come into simultaneous contact with each other, a high level of signal is simultaneously output to the corresponding encoders 812 and 822 through the signal converters 811 and 821 which are connected to a plurality of corresponding vertical sensing data lines $SX_1$-$SX_M$ or a plurality of corresponding horizontal sensing data lines $SY_1$-$SY_N$. This may happen when the object applying pressure to the switch SWT is larger than the resolution of the sensors SU; e.g. the sensors are sensitive enough to register the application of the tip of a stylus but are instead depressed with a larger object such as a fingertip.

For example, as shown in FIG. 8B, when the pressure sensor SU which is connected to r-th and (r+1)-th vertical sensing data lines $SX_r$ and $SX_{r+1}$ is operated, the signal converters 811, each of which is connected to the sensing data lines $SX_r$ and $SX_{r+1}$, simultaneously output a high level of signal during a time period "T". That is, a high level of signal is simultaneously output from two signal converters 811 during a fixed period T.

In this way, when a high level of signal is simultaneously applied from at least two signal converters 811 or at least two signal converters 821 to the corresponding encoders 812 and 822, each of the encoders 812 and 822 determines that a high level of signal is applied from one of the signal converters 811 and 821 and outputs a corresponding X-axis position signal and Y-axis position signal.

For this reason, if a high level of signal is applied from an odd number (q, where q is 1, 3, 5, . . . ) of signal converters 811 or an odd number of signal converters 821, the encoders 812 and 822 determine that a high level of signal is applied from the middle order number of signal converters 811 and 821 and output an 8-bit signal corresponding to the number of the corresponding signal converters 811 and 821 to the corresponding output terminals VX1-VX8 and VY1-VY8.

For example, if a high level of signal is simultaneously applied from the signal converters 811 which are connected to the 3rd to 5th X-axis sensing data lines $SX_3$-$SX_5$, it is determined that a high level of signal is applied from the signal converter 811 which is connected to the 4th X-axis sensing data line $SX_4$, and the encoder 812 outputs "00000011" as the X-axis position signal. As another example, if a high level of signal is simultaneously applied from the signal converters 811 which are connected to each of five sensing data lines from the 4th to 8th X-axis sensing data lines $SX_4$-$SX_8$, it is determined that a high level of signal is applied from the signal converter 811 which is connected to the 6th X-axis sensing data line $SX_6$, the middle sensing data line, and the encoder 812 outputs "00000111" as the X-axis position signal at a corresponding time.

Alternatively, if a high level of signal is applied from an even number (q, where q is 2, 4, 6, . . . ) of signal converters 811 or an even number of signal converters 821, it is determined that a high level of signal is applied from one of each of the signal converters 811 and 821 which are positioned in the middle of the group of signal converters {[(total number of group)/2]-th and [(total number of group)/2+1]-th of the group} and a 8-bit signal corresponding to the corresponding number is output through the corresponding output terminals VX1-VX8 and VY1-VY8.

For example, if a high level of signal is simultaneously applied from the signal converter 811 which is connected to the 2nd to 5th X-axis sensing data lines $SX_2$-$SX_5$, it is determined that a high level of signal is applied from the signal converter 811 which is connected to the 3rd or 4th X-axis sensing data lines $SX_3$ or $SX_4$ which is second or third of a group of the total four sensing data lines.

Accordingly, the encoder 812 outputs "00000010" or "00000011" at a corresponding time.

Additionally, when a contact signal of the pressure sensor SU is simultaneously applied through a given number of vertical sensing data lines $SX_1$-$SX_M$ or horizontal sensing data lines $SY_1$-$SY_N$, of the signal converters 811 and 821, the encoders 812 and 822 output the X-axis sensing signal and the Y-axis sensing signal by considering only the output of the signal converters 811 and 821 which are connected to the sensing data lines $SX_1$-$SX_M$ and $SY_1$-$SY_N$ corresponding to that given number.

For example, if the given set of numbers is four and a high level of signal is simultaneously applied from the signal converter 811 which is connected to the 2nd to 8th vertical sensing data lines $SX_2$-$SX_5$, the encoder 812 considers only a high voltage level signal which is applied from the 2nd to 5th sensing data lines $SX_2$-$SX_5$ in ascending order (the encoder starts with the first vertical sensing line and considers the first four numbers). Therefore, it is determined that a high voltage level signal is applied from the signal converter 811 which is connected to the 3rd or 4th X-axis sensing data line $SX_3$ or $SX_4$, and the encoder 812 outputs "00000011" or "00000100" as an X-axis position signal at a corresponding time. Alternatively, the encoders 812 and 822 may count the set number in descending order.

Examples of operations of the encoders 812 and 822 are shown in Table 1 below.

Table 1 shows an output signal VX1-VX8 of the encoder 812 based on an output signal of eight signal converters connected to sensing data lines $SX_1$-$SX_M$ (where M also equals eight). In Table 1, "0" indicates a state where a signal is in a low level, "1" indicates a state where a signal is in a high level, and "X" indicates a state where a signal may be in a low level or in a high level. A most significant bit ("MSB") of a signal from the encoder 812 is assumed to be a signal which is output from an output terminal $VX_1$, and a least significant bit LSB of a signal is assumed to be a signal which is output from an output terminal $VX_8$. In Table 1, bolded displayed signals show that the sensing data lines $SX_1$-$SX_8$ are connected to the signal converter for outputting the signals, and the number of corresponding sensing data lines $SX_1$-$SX_8$ as an X-axis position signal is output through the encoder 812.

TABLE 1

| | | | | | | | | | | | | | | |
|---|---|---|---|---|---|---|---|---|---|---|---|---|---|---|
| $SX_8$ | 0 | 0 | 0 | 0 | 0 | 0 | 0 | 0 | 0 | 0 | 0 | 0 | 0 | 1 |
| $SX_7$ | 0 | 0 | 0 | 0 | 0 | 0 | 0 | 0 | 0 | 0 | 0 | 1 | 1 | 1 |
| $SX_6$ | 0 | 0 | 0 | 0 | 0 | 0 | 0 | 0 | 0 | 1 | 1 | 1 | X | 1 |
| $SX_5$ | 0 | 0 | 0 | 0 | 0 | 0 | 0 | 1 | 1 | 1 | X | 1 | 0 | 1 |
| $SX_4$ | 0 | 0 | 0 | 0 | 0 | 1 | 1 | 1 | X | 1 | 0 | X | 0 | 1 |
| $SX_3$ | 0 | 0 | 0 | 1 | 1 | 1 | X | 1 | 0 | X | 0 | 0 | 0 | 0 |
| $SX_2$ | 0 | 0 | 1 | 1 | X | 1 | 0 | X | 0 | 0 | 0 | 0 | 0 | 0 |
| $SX_1$ | 0 | 1 | X | 1 | 0 | X | 0 | 0 | 0 | 0 | 0 | 0 | 0 | 0 |
| VX1(MSB) | 0 | 0 | 0 | 0 | 0 | 0 | 0 | 0 | 0 | 0 | 0 | 0 | 0 | 0 |

TABLE 1-continued

| | | | | | | | | | | | | | | |
|---|---|---|---|---|---|---|---|---|---|---|---|---|---|---|
| VX2 | 0 | 0 | 0 | 0 | 0 | 0 | 0 | 0 | 0 | 0 | 0 | 0 | 0 | 0 |
| VX3 | 0 | 0 | 0 | 0 | 0 | 0 | 0 | 0 | 0 | 0 | 0 | 0 | 0 | 0 |
| VX4 | 0 | 0 | 0 | 0 | 0 | 0 | 0 | 0 | 0 | 0 | 0 | 0 | 0 | 0 |
| VX5 | 0 | 0 | 0 | 0 | 0 | 0 | 0 | 0 | 0 | 0 | 0 | 0 | 0 | 0 |
| VX6 | 0 | 0 | 0 | 0 | 0 | 0 | 1 | 1 | 1 | 1 | 1 | 1 | 1 | 1 |
| VX7 | 0 | 0 | 1 | 1 | 1 | 1 | 0 | 0 | 0 | 0 | 1 | 1 | 1 | 1 |
| VX8(LSB) | 0 | 1 | 0 | 0 | 1 | 1 | 0 | 0 | 1 | 1 | 0 | 1 | 1 | 0 |

The X-axis position signal and the Y-axis position signal of the pressure sensor SU which comes into contact with the encoders 812 and 822 are output to the signal output unit 830. The signal output unit 830 outputs the X-axis position signal and the Y-axis position signal in series as a digital sensing signal DSN to the contact determiner 700. The contact determiner 700 controls the timing in which the signal output unit 830 outputs the digital sensing signal DSN.

The contact determiner 700 reads a digital sensing signal DSN from the signal output unit 830 after an interrupt signal TE_INT is output from an interrupt signal generator 840 shown in FIG. 7B is changed to a high level.

That is, as shown in FIG. 7B, if at least one of input signals of the encoders 812 and 822 is in a high level, the interrupt signal generator 840 outputs a high level of interrupt signal TE_INT. That is, if even one pressure sensor SU operates, the interrupt signal generator 840 outputs a state of the interrupt signal TE_INT at a high level. In this way, if the interrupt signal TE_INT changes to a high level, the contact determiner 700 outputs a read signal, or other similar signal, to the signal output unit 830. Accordingly, the signal output unit 830 outputs the digital sensing signal DSN to the contact determiner 700.

By using a digital signal as described in the above exemplary embodiments whose state changes depending on whether or not the contact of the pressure sensor SU occurs, instead of determining whether the pressure sensor SU is operated by sensing a current, which is an analog signal flowing through the pressure sensor SU, erroneous operations due to a leakage current and unnecessary power consumption are decreased or effectively eliminated.

Furthermore, because X-axis and Y-axis position signals of the pressure sensor SU are generated by processing a digitalized signal, the corresponding circuitry structure becomes simpler than when processing an analog signal current. Accordingly, when the sensing signal processor 800 is mounted in a single chip 610, the mounting area decreases and the structure of the single chip 610 is simplified.

Moreover, since a position of an applied pressure is determined to be the pressure sensor SU in the middle of a plurality of pressure sensors SU when the pressure sensors SU in corresponding multiple points in the same direction are simultaneously operated, rapid and simple signal processing is possible and thus a structure of the sensing signal processor also becomes simple.

Now, referring to FIGS. 9 to 10B, a sensing signal processor according to another exemplary embodiment of the present invention will be described in detail.

Figure 9:
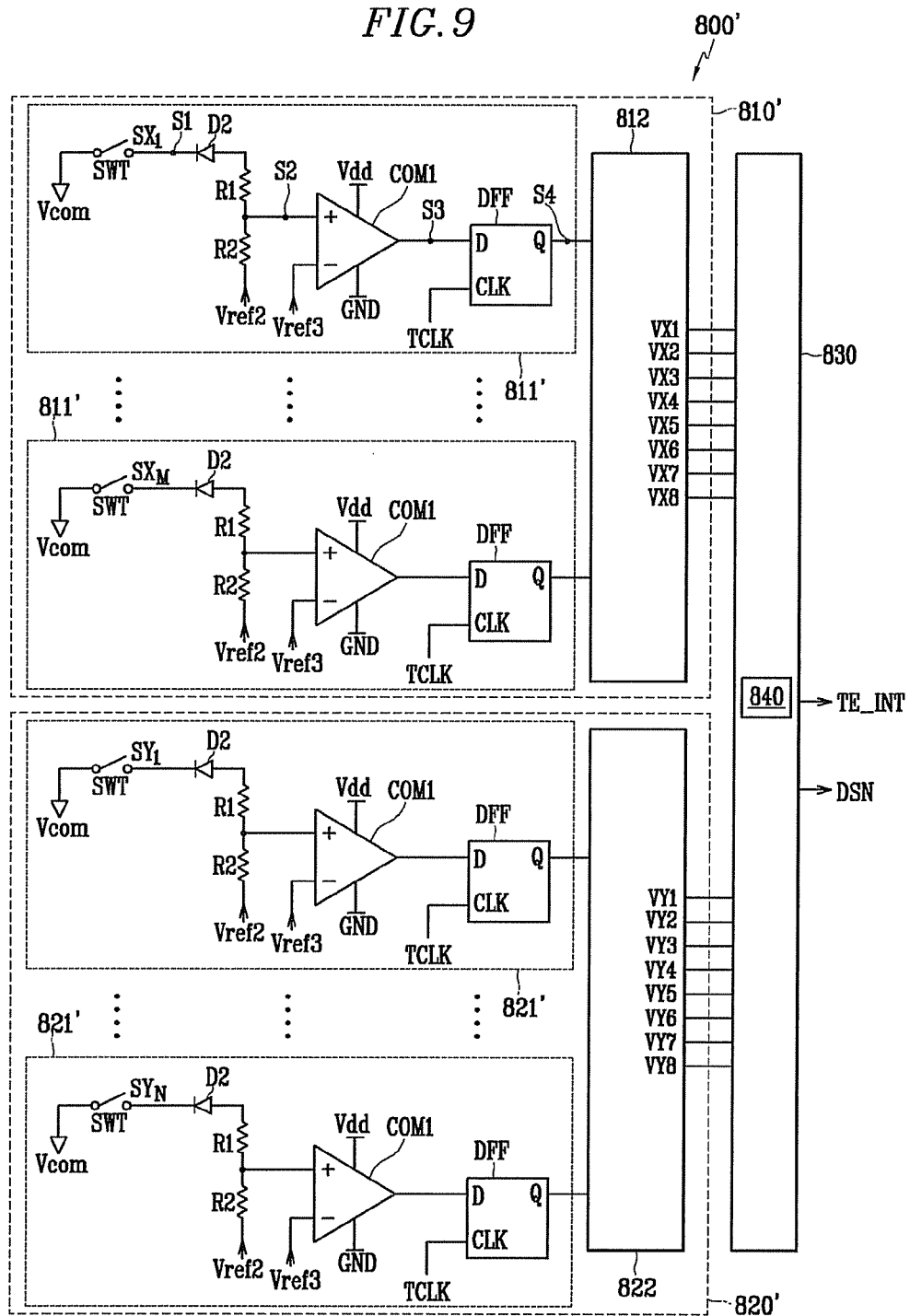
FIG. 9 is a circuit schematic diagram of another exemplary embodiment of a signal processing apparatus of a pressure sensor according to the present invention.
Figure 10A:
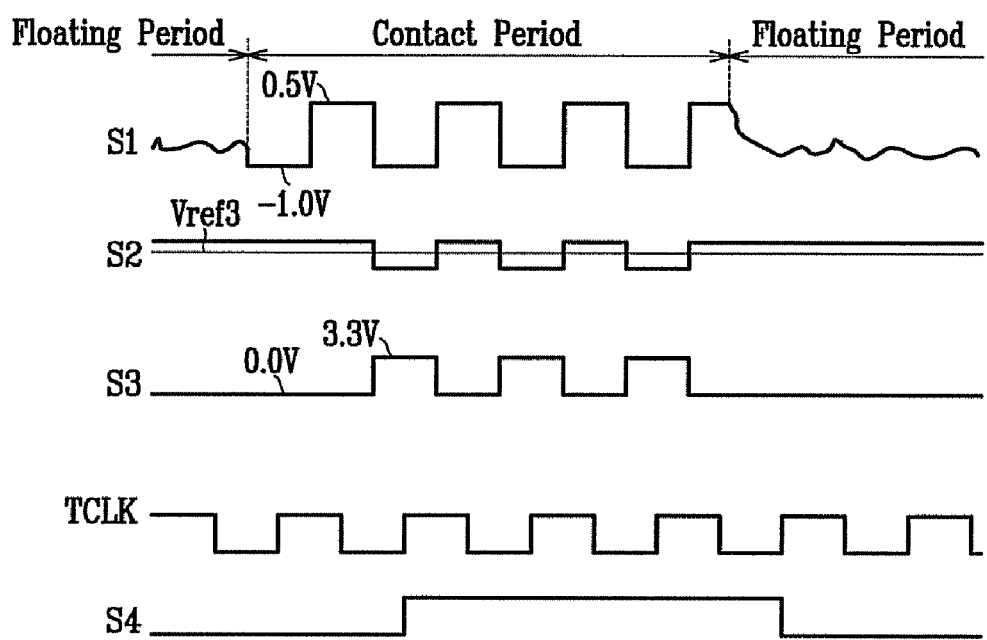
FIG. 10A is an operational timing chart of another exemplary embodiment of a signal processing apparatus of a pressure sensor according to the present invention, and illustrates a case where a common voltage swings between a high level and a low level at predetermined times.
Figure 10B:
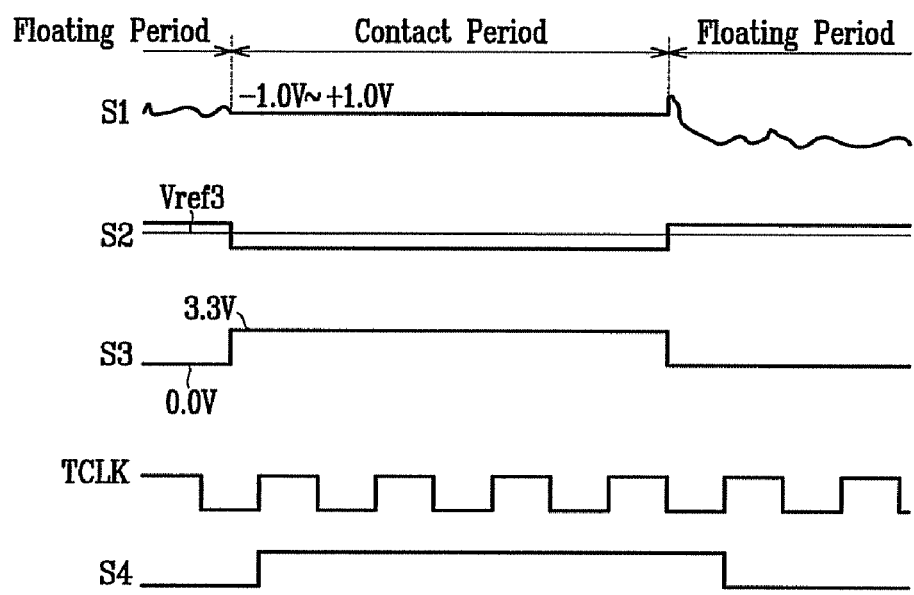
FIG. 10B is an operational timing chart of another exemplary embodiment of a signal processing apparatus of a pressure sensor according to the present invention, and illustrates a case where a common voltage is fixed at a predetermined voltage.

FIG. 9 is a circuit schematic diagram of another exemplary embodiment of a signal processing apparatus of a pressure sensor SU according to the present invention. FIG. 10A is an operational timing chart of another exemplary embodiment of a signal processing apparatus of a pressure sensor according to the present invention, and illustrates a case where a common voltage swings between a high level and a low level at predetermined times. FIG. 10B is an operational timing chart of another exemplary embodiment of a signal processing apparatus of a pressure sensor according to the present invention, and illustrates a case in which a common voltage is fixed at a predetermined voltage.

As shown in FIG. 9, the sensing signal processor according to the present exemplary embodiment is substantially similar to that shown in FIGS. 7A and 7B. The differences include the relationship of a direction of a diode D2 of each of the signal converters 811' and 821' in the data signal read units 810' and 820', a voltage Vref2 which is applied to the resistors R1 and R2, and a voltage Vref3 which is applied to the comparator COM1, the sensing signal processor 800' has the same structure as the sensing signal processor 800 shown in FIGS. 7A and 7B. Therefore, the same reference numerals as in FIGS. 7A and 7B denote units for performing the same operations with the same structures, and thus descriptions thereof will be omitted. The diode D1 of the signal converters 811 and 821 in the sensing signal processor 800 shown in FIGS. 7A and 7B is connected in a forward direction, and the resistors R1 and R2 are connected between the diode D1 and the ground, but the diode D2 of the signal converters 811' and 821' in the sensing signal processor 800' according to the present exemplary embodiment shown in FIG. 9 is connected in a backward direction and the resistors R1 and R2 are connected to the reference voltage Vref2. Furthermore, a non-inversion terminal (+) is connected to a common terminal of the resistors R1 and R2, and an inversion terminal (−) is connected to a reference voltage Vref3.

In one exemplary embodiment the common voltage Vcom has a high level and a low level, and when the common voltage Vcom swings between a high level and a low level in a predetermined amount of time, the reference voltage Vref2 has a value which is larger than a high level of the common voltage Vcom. In another exemplary embodiment, when the common voltage Vcom is a DC voltage having a fixed voltage, a reference voltage Vref2 has a value which is larger than the common voltage Vcom.

Next, an operation of the sensing signal processor according to another exemplary embodiment of the present invention will be described.

First, referring to FIG. 10A, the exemplary embodiment where the common voltage Vcom has a high level and a low level and the applied common voltage Vcom swings between a high level and a low level every 1H will be described. A high level value of the common voltage Vcom may be about 5 V and a low level value thereof may be about −1.0 V, and the liquid crystal display has a row inversion.

An operation of the sensing signal processor according to the present exemplary embodiment is almost the same as that of the sensing signal processor 800 which has been described above with reference to FIG. 7A.

Since operations of the signal converters 811' and 821' which are connected to each of the sensing data lines $SX_1$-$SX_M$ and $SY_1$-$SY_N$ are substantially the same, only an operation of the signal converter 811', which is connected to the vertical sensing data line SX1, will be described.

When a switch SWT, which is part of a pressure sensor SU which in turn is connected to the vertical sensing data line $SX_1$, is closed due to an external pressure, a sensing data signal P1, which is similar in voltage to a common voltage Vcom, is output from the switch SWT to the resistors R1 and R2 through a vertical sensing data line $SX_1$ during the period in which external pressure is applied (a contact period), as shown in FIG. 10A. Any period in which external pressure is not applied is referred to as a floating period.

The resistors R1 and R2 lower a voltage level of the signal by dividing a voltage of the input sensing data signal into predetermined voltage magnitudes and then apply the signal to a non-inversion terminal (+) of the comparator COM1. The reference voltage Vref3 which is applied to the inversion terminal (−) of the comparator COM1 is set to be lower than a high level Vdd of the split supply voltage. Accordingly, as shown in FIG. 10A, the comparator COM1 applies a corresponding level of signal to the input terminal D of the D flip-flop DFF depending on a state of a signal which is applied to two input terminals (+, −).

Therefore, because the D flip-flop DFF outputs a signal by synchronizing a corresponding level of signal with a clock signal TCLK depending on a state of the signal which is applied to the input terminal D, as shown in FIG. 10A, the D flip-flop DFF maintains a high level state during a predetermined time based on the contact period.

Similar to an operation of the signal converters 811, the signal converters 811' and 821' which are connected to each of the sensing data lines $SX_1$-$SX_M$ and $SY_1$-$SY_N$ process a sensing data signal which is output from the corresponding sensing data lines $SX_1$-$SX_M$ and $SY_1$-$SY_N$ and apply a corresponding level of signal to the encoders 812 and 822.

Therefore, similar to the description with reference to FIG. 7A, the encoders 812 and 822 output an X-axis position signal and an Y-axis position signal to the signal output unit 830 through the output terminals VX1-VX8 and VY1-VY8 based on a signal which is applied to each input terminal.

Next, referring to FIG. 10B, an operation of the sensing signal processor in the exemplary embodiment where the common voltage Vcom is a DC voltage which maintains a predetermined voltage level will be described.

The common voltage Vcom may constantly maintain any value in a range of −1.0 V to +1.0 V, and the liquid crystal display is of the dot inversion type.

Since operations of the signal converters 811' and 821' which are connected to each of the sensing data lines $SX_1$-$SX_M$ and $SY_1$-$SY_N$ are substantially similar, only an operation of the signal converter 811' which is connected to the vertical sensing data line SX1 will be described.

When the switch SWT of the pressure sensor SU, which is connected to the vertical sensing line $SX_1$ is closed due to an external pressure, a sensing data signal P1 is output from the switch SWT to the resistors R1 and R2, as shown in FIG. 9. The sensing data signal is almost the same as that of the common voltage Vcom and is applied as long as the external pressure is applied (also referred to as a contact period).

The voltage of the sensing data signal is divided into voltages between a reference voltage Vref2 and the common voltage Vcom by the resistors R1 and R2 and is then applied to a non-inversion terminal (+) of the comparator COM1. At this time, because the reference voltage Vref3 which is applied to the inversion terminal (−) of the comparator COM1 is larger than a magnitude of the common voltage Vcom which is divided by the resistors R1 and R2, the comparator COM1 outputs a high level of signal to the D flip-flop DFF during a contact period (FIG. 10B). Therefore, the D flip-flop DFF outputs a corresponding level of signal to the encoder 812 by synchronizing with a clock signal TCLK.

Similar to an operation of the signal converter 811, the signal converters 811' and 821' which are connected to each of the sensing data lines $SX_1$-$SX_M$ and $SY_1$-$SY_N$ process a sensing data signal which is output from the corresponding sensing data lines $SX_1$-$SX_M$ and $SY_1$-$SY_N$ and apply a corresponding level of signal to the encoders 812 and 822.

Therefore, similar to the description with reference to FIG. 7A, the encoders 812 and 822 output the signals VX1-VX8 and VY1-VY8 corresponding to X-axis position information and Y-axis position information to the signal output unit 830 based on a signal which is applied to each input terminal.

In an alternative exemplary embodiment of a sensing signal processor such as is shown in FIGS. 7A and 7B, when a common voltage Vcom, which has a predetermined magnitude of DC voltage, is used, a voltage, which is lower than the common voltage Vcom, may be used instead of connecting the resistors R1 and R2 to the ground. Exemplary embodiments of this voltage may be less than 1.0 V.

According to these exemplary embodiments of the present invention erroneous operation of the sensing signal processor due to a leakage current and unnecessary power consumption are decreased, rapid and simple signal processing is possible, and thus a structure of a sensing signal processor also becomes simple.

Additionally, by changing a direction of a diode D2 of the sensing signal processor to a forward direction and allowing the common voltage Vcom to maintain a predetermined magnitude of DC voltage, dot inversion and column inversion as well as row inversion are possible in the liquid crystal display.

In each the above-mentioned exemplary embodiments a magnitude of each of the reference voltages Vref1-Vref3 may be changed according to a magnitude of the voltages used and the connection relationship of input terminals (+, −) of the comparator COM1 may be adjusted, and the voltage resistors R1 and R2 may have their magnitudes adjusted. Furthermore, when the pressure sensor SU is operated, a high level signal is output to the encoders 812 and 822 through corresponding signal converters 811, 821, 811', and 821', but a low level signal may also be output.

Furthermore, a liquid crystal display has been described in an exemplary embodiment of the present invention, but the display device is not limited thereto and the present invention can be equally applied to a display device such as a plasma display device and an organic light emitting display.

According to the present invention, the detection of whether a pressure sensor is being operated is conducted using a voltage which is applied through a pressure sensor, so that an erroneous operation due to a leakage current and unnecessary power consumption are decreased or effectively prevented.

Furthermore, because X-axis and Y-axis position signals of the pressure sensor are generated by processing a digitalized signal, a structure of a sensing signal processor may be made more simply, and a mounting area of a sensing signal processor which is mounted in a single chip is reduced and thus a structure of a single chip 610 is simplified.

Moreover, when pressure sensors in corresponding multiple points in the same direction are simultaneously operated, a position thereof is determined as if a pressure sensor in the middle is of the simultaneously operated sensors had been solely operated, so that rapid and simple signal processing is possible, and thus a structure of a sensing signal processor also becomes simple.

Furthermore, a signal of a sensor is processed by changing a connection direction of a diode in a signal converter depending on the type of common voltage applied thereto. Accordingly, a display device including a sensing signal processor according to the present invention can represent a desired inversion form such as dot inversion, row inversion, or column inversion without limit to the kind of a common voltage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
    a first panel;
    a second panel;
    a gate line extending in a first direction;
    a data line extending in a second direction, substantially different from the first direction, on the second panel;
    a first sensing data line extending in the first direction on the second panel;
    a second sensing data line extending in the second direction on the second panel;
    a first sensor connected to the first sensing data line;
    a second sensor connected to the second sensing data line;
    a first signal converter which compares a first sensing data signal from the first sensing data line with a first reference voltage and outputs a first sensing output signal;
    a second signal converter which compares a second sensing data signal from the second sensing data line with the first reference voltage and outputs a second sensing output signal;
    a first position signal output unit which outputs a predetermined bit of a first position signal depending on the first sensing output signal;
    a second position signal output unit which outputs a predetermined bit of a second position signal depending on the second sensing output signal;
    a signal output unit which outputs a digital sensing signal in series based on the first position signal and the second position signal from the first position signal output unit and the second position signal output unit, respectively; and
    a contact determiner which determines a contact position of the first sensor and the second sensor based on the digital sensing signal from the signal output unit,
    wherein each of the first and second sensors includes a switch which has a common electrode disposed on the first panel as a first terminal and the first sensing data line or the second sensing data line as a second terminal.

2. The display device of claim 1, wherein the first and second signal converters each comprise:
    a voltage divider which divides a voltage of a sensing data signal, wherein the sensing data signal is one of the first sensing data signals and the second sensing data signals;
    a comparator which compares a divided voltage from the voltage divider with the first reference voltage; and
    a D flip-flop which outputs a flip-flop output signal from the comparator, wherein the voltage level of the flip-flop output signal depends on a clock signal.

3. The display device of claim 2, further comprising a diode connected in a forward direction between a sensing data line and the voltage divider, wherein the sensing data lines is one of the first sensing data line and the second sensing data line.

4. The display device of claim 3, wherein the voltage divider comprises first and second resistors connected between the diode and a ground, and
    the comparator is an operational amplifier in which a non-inversion terminal thereof is connected to a common terminal of the first and second resistors and an inversion terminal thereof is connected to the first reference voltage.

5. The display device of claim 2, further comprising a diode connected in a backward direction between a sensing data line and the voltage divider, wherein the sensing data line is one of the first sensing data line and the second sensing data line.

6. The display device of claim 5, wherein the voltage divider comprises first and second resistors which are connected between the diode and a second reference voltage, and
    the comparator is an operational amplifier in which a non-inversion terminal thereof is connected to a common terminal of the first and second resistors and a non-inversion terminal thereof is connected to a third reference voltage.

7. The display device of claim 1, wherein the first and second position signal output units are encoders.

8. The display device of claim 7, wherein the first and second signal converters output a high voltage level signal when the first and second sensors which are connected thereto, respectively, are operated by closing the switch.

9. The display device of claim 8, wherein the first and second position signal output units convert a number for outputting a high voltage level signal, which is output by the first and second signal converters, to a binary and output the binary as the first and second position signals.

10. The display device of claim 8, wherein when there are multiple first signal converters and multiple second signal converters outputting a high voltage level signal the first and second position signal output units convert a number output by the first and second signal converters which are positioned in the middle of the multiple first and second signal converters to a binary and output the binary as the first and second position signals.

11. The display device of claim 10, wherein the first and second position signal output units convert the number output by the first and second signal converters positioned in a (q/2) or [(q/2)+1]th position to a binary and output the binary as the first and second position signals wherein there are an even number of first and second signal converters for outputting a high voltage level signal and (q) is the total number of the multiple first and second signal converters.

12. The display device of claim 11, wherein the first and second position signal output units exclude the first and second sensing output signals from the first and second signal converters which exceed a predetermined number when the first and second signal converters for outputting a high voltage level signal exceed the predetermined number.

13. The display device of claim 1, wherein the contact determiner reads a digital sensing signal from the signal output unit when at least one of the first and second sensors is operated by closing the switch.

14. The display device of claim 13, wherein the signal output unit comprises an interrupt signal generator for outputting an interrupt signal to the contact determiner.

15. The display device of claim 14, wherein the contact determiner reads a digital sensing signal from the signal output unit when the interrupt signal is at a high voltage level.

16. The display device of claim 15, wherein the interrupt signal generator comprises:
    a first OR circuit in which an input terminal thereof is connected to an output terminal of the first position signal output unit;
    a second OR circuit in which an input terminal thereof is connected to an output terminal of the second position signal output unit; and an AND circuit connected to output terminals of the first and second OR circuits.

17. The display device of claim 1, wherein the first and second sensors are pressure sensors.

18. A sensing signal processing apparatus comprising:
a first signal converter which compares a first sensing data signal from a first sensor with a first reference voltage and outputs a first sensing output signal;
a second signal converter which compares a second sensing data signal from a second sensor with the first reference voltage and outputs a second sensing output signal;
a first position signal output unit which outputs a predetermined bit of a first position signal depending on the first sensing output signal;
a second position signal output unit which outputs a predetermined bit of a second position signal depending on the second sensing output signal; and
a signal output unit which outputs a digital sensing signal in series based on the first position signal and the second position signal from the first position signal output unit and the second position signal output unit, respectively,
wherein the first signal converter and the second signal converter each comprise:
a voltage divider which divides a voltage of a sensing data signal, wherein the sensing data signal is one of the first sensing data signal and the second sensing data signal;
a comparator which compares a divided voltage from the voltage divider with the first reference voltage; and
a D flip-flop which outputs a flip-flop output signal from the comparator to a corresponding level of signal depending on a clock signal, wherein the voltage level of the flip-flop output signal depends on a clock signal.

19. The sensing signal processing apparatus of claim 18, further comprising a diode connected in a forward direction between a sensing data line and the voltage divider, wherein the sensing data line is one of the first sensing data line and the second sensing data line.

20. The sensing signal processing apparatus of claim 19, wherein the voltage divider comprises first and second resistors connected between the diode and a ground, and
the comparator is an operational amplifier in which a non-inversion terminal thereof is connected to a common terminal of the first and second resistors and an inversion terminal thereof is connected to the first reference voltage.

21. The sensing signal processing apparatus of claim 18, further comprising a diode connected in a backward direction between a sensing data line and the voltage divider, wherein the sensing data line is one of the first sensing data line and the second sensing data line.

22. The sensing signal processing apparatus of claim 21, wherein the voltage divider comprises first and second resistors connected between the diode and a second reference voltage, and the comparator is an operational amplifier in which a non-inversion terminal thereof is connected to a common terminal of the first and second resistors and a non-inversion terminal thereof is connected to the first reference voltage.

23. The sensing signal processing apparatus of claim 18, wherein the first and second position signal output units are encoders.

24. The sensing signal processing apparatus of claim 23, wherein the first and second position signal output units convert a number for outputting a high voltage level signal, which is output by the first and second signal converters, to a binary and output the binary as the first and second position signals.

25. The sensing signal processing apparatus of claim 24, wherein when there are multiple first signal converters and multiple second signal converters outputting a high voltage level signal the first and second position signal output units convert a number output by the first and second signal converters which are positioned in the middle of the multiple first and second signal converters to a binary and output the binary as the first and second position signals.

26. The sensing signal processing apparatus of claim 25, wherein the first and second position signal output units convert the number output by the first and second signal converters positioned in a (q/2) or [(q/2)+1]th position to a binary and output the binary as the first and second position signals wherein there are an even number of the first and second signal converters for outputting a high voltage level signal and (q) is the total number of the multiple first and second signal converters.

27. The sensing signal processing apparatus of claim 26, wherein the first and second position signal output units exclude the first and second sensing output signals from the first and second signal converters which exceed a predetermined number when the first and second signal converters for outputting a high voltage level signal exceed the predetermined number.

28. The sensing signal processing apparatus of claim 18, wherein the signal output unit comprises an interrupt signal generator for outputting an interrupt signal.

29. The sensing signal processing apparatus of claim 28, wherein the interrupt signal generator comprises:
a first OR circuit in which an input terminal thereof is connected to an output terminal of the first position signal output unit;
a second OR circuit in which an input terminal thereof is connected to an output terminal of the second position signal output unit; and
an AND circuit connected to output terminals of the first and second OR circuits.

30. The sensing signal processing apparatus of claim 29, wherein the signal output unit outputs digital sensing signals in series in synchronization with the interrupt signal.

* * * * *